Patented Jan. 27, 1953

2,626,910

UNITED STATES PATENT OFFICE 2,626,910

PROCESS FOR BREAKING PETROLEUM EMULSIONS

Melvin De Groote, University City, Mo., assignor to Petrolite Corporation, a corporation of Delaware No Drawing. Application May 14, 1951, Serial No. 226,326

10 Claims. (Cl. 252—340)

The present invention is a continuation-in-part of my copending applications, Serial Nos. 104,801 and 104,802, both filed July 14, 1949 (Serial No. 104,801 now being Patent 2,552,528, granted May 15, 1951, and Serial No. 104,802 being abandoned).

The present invention is concerned with a process for breaking petroleum emulsions of the water-in-oil type characterized by subjecting the emulsion to the action of a demulsifier, including an acidic fractional ester of a polycarboxy acid with oxypropylated glucose, the oxypropylated glucose having a molecular weight between 1500 and 15,000 on an average statistical basis and being xylene-soluble, and the glucose representing not more than 12% by weight of it on a statistical basis, the proportions and weights being based upon an assumption of a complete reaction between the propylene oxide and the glucose, the polycarboxy acid having two or three carboxy groups and being used, in forming the ester, in molar proportions of one mole of acid to each available hydroxyl group of the oxypropylated glucose.

Complementary to the aspect of the invention herein disclosed is my companion invention concerned with the new chemical products or compounds used as the demulsifying agents in the processes or procedures of this invention, as well as the application of such chemical compounds, products, or the like, in various other arts and industries, along with the method for manufacturing said new chemical products or compounds which are of outstanding value in demulsification. See my co-pending application, Serial No. 226,327, filed May 14, 1951.

For convenience, what is said hereinafter will be divided into three parts:

Part 1 will be concerned with the preparation of the oxypropylated derivatives;

Part 2 will be concerned with the preparation of the acidic esters by reacting the polyhydroxylated compounds with polycarboxy acids; and Part 3 will be concerned with the use of such acidic fractional esters as demulsifiers for resolving petroleum emulsions of the water-in-oil type.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment of pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature-low-reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure-low temperature-low-reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet, pressure gauge, manual vent line; charge hole for initial reactant; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer, connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C.

Numerous reactions were conducted in which the time varied as far as a partial oxypropylation step was concerned from 8 to 12 hours, and in some instances even from 14 to 18 hours. In some instances the reaction may have taken place in considerably less time, for instance, one-half or two-thirds the indicated time. In the series subsequently used for illustration the minimum time recorded was 8 hours. Reactions indicated as being complete in 8 hours may have been complete in a lesser period of time in light of the automatic equipment employed. This applies also where the reactions were complete in a longer period of time, for instance, 10 or 12 hours.

In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure.

However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

*Example 1a*

The starting material was commercial anhydrous glucose commonly sold under the name of anhydrous dextrose. The catalyst employed was sodium methylate. The solvent employed was the diethyl ether of diethylene glycol. The autoclave used was one having a capacity of about 15 gallons or approximately 125 pounds. The equipment had all the control devices previously described. The speed of the stirrer could be varied from 150 to 350 R. P. M. 4 pounds of anhydrous glucose were charged into the autoclave. To this was added ½ pound of sodium methylate and 10 pounds of the diethylether of diethylene glycol. The reaction pot was flushed out with nitrogen. The autoclave was sealed and the automatic devices adjusted for injecting 43.25 pounds of propylene oxide in about 8 hours. The injection was at the rate of about 6 pounds per hour. This time period was comparatively short due in part to the fact that there was present a considerable concentration of catalyst. This particular oxypropylation was conducted at a temperature moderately above the boiling point of water, about 250° to 260° F. The pressure regulator was set for a maximum of 25 pounds before actually proceeding with this particular oxypropylation step, and in all the succeeding steps as exemplified by Examples 2a, 3a and 4a the pressure did not go above 20 pounds per square inch. This was due probably to the fact that propylene oxide reacted rather rapidly at this particular temperature in light of the amount of catalyst present. The initial introduction of propylene oxide was not started until the heating devices had raised the temperature to above the boiling point of water, for instance, approximately 240° to 245° F. All told, the reaction was complete in less than 8 hours but stirring was continued to the end of the 8-hour period. At the end of this reaction time, part of the reaction mass was withdrawn as a sample and the remainder subjected to further oxypropylation as described in Example 2a, following.

*Example 2a*

50.13 pounds of the reaction mass equivalent to 3.46 pounds of dextrose, 37.57 pounds of propylene oxide, .43 pound of sodium methylate, and 8.67 pounds of solvent, and identified as Example 1a, preceding, were subjected to further oxypropylation under substantially the same conditions as described in Example 1a, particularly in regard to temperature and pressure. No additional catalyst was introduced.

The reaction time was 8¼ hours. The amount of oxide added was 18.75 pounds. The propylene oxide was introduced at the rate of about 2½ pounds per hour. At the completion of the reaction part of the mass was withdrawn as a sample and the remainder subjected to further oxypropylation as described in Example 3a, immediately following.

*Example 3a*

53.64 pounds of the reaction mass previously identified as Example 2a and equivalent to 2.69 pounds of dextrose, 43.87 pounds of propylene oxide, .33 pound of sodium methylate, and 6.75 pounds of solvent, were subjected to further oxypropylation in the same manner as described in the two preceding examples. No added catalyst was employed. Conditions as far as temperature and pressure were concerned were the same as in Examples 1a and 2a, preceding. The time required to add the oxide was 12 hours. The amount of oxide added was 30.74 pounds, which was added at the rate of about 3 pounds per hour.

At the completion of the reaction part of the sample was withdrawn and the remainder subjected to further oxypropylation as noted in Example 4a, immediately following.

*Example 4a*

64 pounds of the reaction mass identified as Example 3a, preceding, and equivalent to 2.04 pounds of dextrose, 56.58 pounds of propylene oxide, .25 pound of sodium methylate, and 5.13 pounds of solvent, were subjected to further oxypropylation in the same manner as described in the three previous examples. Conditions as far as temperature and pressure were concerned were the same as in the previous examples. No added catalyst was introduced. The time required to add the oxide was 10 hours. The amount of oxide added was 13.12 pounds. The oxide was added at the rate of about 1½ pounds per hour. The addition of oxide was slow due probably to the increased size of molecule and also to the lower concentration of catalyst.

What has been said in regard to the preceding examples is presented in tabular form in Table 1, following, with some added information as to molecular weight and as to solubility of the reaction product in water, xylene, and kerosene.

in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxy value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

TABLE 1

| Ex. No. | Composition Before | | | | Theo. M. W. | Composition at End | | | | | Max. Temp., °F. | Max. Pres., lbs. sq. in. | Time, hrs. |
|---|---|---|---|---|---|---|---|---|---|---|---|---|---|
| | H. C. Amt., lbs. | Oxide Amt., lbs. | Catalyst, lbs. | Solvent, lbs. | | H. C. Amt., lbs. | Oxide Amt., lbs. | Catalyst, lbs. | Solvent, lbs. | Hyd. Mol. Wt. | | | |
| 1a | 4.0 | -------- | 0.5 | 10.0 | 2,100 | 4.0 | 43.25 | 0.5 | 10.0 | 1,365 | 250-260 | 15-20 | 8 |
| 2a | 3.46 | 37.57 | .43 | 8.67 | 3,110 | 3.46 | 56.32 | .43 | 8.67 | 1,865 | 250-260 | 15-20 | 8¼ |
| 3a | 2.69 | 43.87 | .33 | 6.75 | 5,170 | 2.69 | 74.61 | .33 | 6.75 | 2,810 | 250-260 | 15-20 | 12 |
| 4a | 2.04 | 56.58 | .25 | 5.13 | 6,320 | 2.04 | 69.70 | .25 | 5.13 | 3,430 | 250-260 | 15-20 | 10 |

Example 1a was soluble in both water and xylene but insoluble in kerosene; Example 2a was emulsifiable in water, soluble in xylene, and dispersible in kerosene; Examples 3a and 4a were insoluble in water, and soluble in both xylene and kerosene.

In other comparable oxypropylations I have employed increased amounts of propylene oxide in ratios to the point where approximately twice the amount of propylene oxide was used as in the above examples, i. e., where the glucose represented 1% or less of the final product. However, under such circumstances there was not the proportional increase in the hydroxyl molecular weight which rose, for example, to a maximum of 5,000 or 5,500, based on a theoretical molecular weight of about 12,000 or slightly higher. In all such instances the products were insoluble in water and soluble in both xylene and kerosene.

The final products were quite dark in color and were somewhat viscous liquids. This was more or less characteristic of all the oxypropylated products at the various stages. The color of all these products was reddish. In some cases it was so dark as to be nearly black. These products were, of course, slightly alkaline due to the residual sodium methylate. The residual basicity due to the catalyst, of course, would be the same as if caustic soda had been used.

Speaking of insolubility in water or solubility in kerosene such solubility test can be made simply by shaking small amounts of the materials

PART 2

As previously pointed out the present invention is concerned with acidic esters obtained from the oxypropylated derivatives described in Part 1, immediately preceding, and polycarboxy acids, particularly tricarboxy acids like citric, and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purposes of economy it is customary to use either the acid or the anhydride. A conventional procedure is employed. On a laboratory scale one can employ a resin pot of the kind described in U. S. Patent No. 2,499,370, dated March 7, 1950, to DeGroote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as paratoluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures were conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both glucose radicals and acid radicals; the product is characterized by having only one glucose radical.

By following slight modifications of what has been said previously one can conduct the esterification on a laboratory scale with greater convenience. Obviously, if one starts with a polyhydric compound having 3 or more hydroxyls and adds a dicarboxy acid there is at least some opportunity for cross-linking and formation of insoluble materials. However, solubility or a gelation effect can arise in other ways, for instance, possible incipient cross-linking rather than intermediate or complete cross-linking, and also the fact that there are certain limitations as far as solubility goes in any large molecule, to say nothing of peculiarities of structure insofar that one of the original reactants, for instance, dipentaerythritol or tripentaerythritol, are much less soluble in water than one might ordinarily expect on the carbon-oxygen ratio. After the water is removed in the case of the esterification by means of a water-insoluble solvent, such as benzene, xylene or the use of some other comparable solvent or mixtures, one is confronted with the fact that the acidic ester is not necessarily soluble in such nonpolar solvent, and possibly because it either does cross-link or at least gives a pseudo gel. I have used the terminology "pseudo gel" for the reason that such gel is reversible as distinguished from a true non-reversible gel produced by cross-linking. The exact nature of this tendency to become insoluble or tendency toward gelation is obscure and not fully understood. In light of the effect of semi-polar solvents there may be some relationship, and in fact an important one to hydrogen bonding factors.

However, by the addition of a semi-polar solvent, such as Diethyl Carbitol, which is the trade name for diethyleneglycol diethylether, or some other similar solvent such as an alcohol, one tends to reduce or eliminate this effect. The alcohol, of course, must be added at the end of the reaction so as to not interfere with the esterification. The non-hydroxy semi-polar solvent can be retained at the start of esterification provided it does not interfere with water removal. In any event, one can obtain a homogeneous system in which substantially the entire material is solid.

Referring to the original oxypropylation it will be noted that the diethyl ether of diethylene glycol was used as a solvent to give a slurry. Afterwards only xylene was employed but the mixture during esterification, of course, represented the combination so obtained. If xylene had been used in the oxypropylation step instead of the diethyl ether of diethylene glycol then and in that event if there had been any tendency towards cross-linking or formation of a gelatinous compound it may have been desirable to add some oxygenated solvent.

The data included in subsequent tables, i. e., Tables 2 and 3, are self-explanatory and very complete and it is believed no further elaboration is necessary.

TABLE 2

| Ex. No. of Acid Ester | Ex. No. of Oxy. Cmpd. | Theo. M. W. of H. C. | Theo. Hydroxyl V. of H. C. | Actual Hydrox. Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 2,100 | 133.5 | 205 | 1,365 | 164 | Diglycollic Acid | 80.5 |
| 2b | 1a | 2,100 | 133.5 | 205 | 1,365 | 164 | Oxalic Acid | 75.5 |
| 3b | 1a | 2,100 | 133.5 | 205 | 1,365 | 164 | Aconitic Acid | 104.5 |
| 4b | 1a | 2,100 | 133.5 | 205 | 1,365 | 164 | Phthalic Anhyd | 89.0 |
| 5b | 1a | 2,100 | 133.5 | 205 | 1,365 | 164 | Maleic Anhyd | 58.7 |
| 6b | 1a | 2,100 | 133.5 | 205 | 1,365 | 164 | Citraconic Anhyd | 67.0 |
| 7b | 2a | 3,110 | 90.0 | 150 | 1,865 | 173.5 | Diglycollic Acid | 62.4 |
| 8b | 2a | 3,110 | 90.0 | 150 | 1,865 | 173.5 | Aconitic Acid | 81.0 |
| 9b | 2a | 3,110 | 90.0 | 150 | 1,865 | 175.0 | Oxalic Acid | 59.0 |
| 10b | 2a | 3,110 | 90.0 | 150 | 1,865 | 174.0 | Phthalic Anhyd | 69.0 |
| 11b | 2a | 3,110 | 90.0 | 150 | 1,865 | 179.0 | Maleic Anhyd | 47.9 |
| 12b | 2a | 3,110 | 90.0 | 150 | 1,865 | 173.5 | Citraconic Anhyd | 52.0 |
| 13b | 3a | 5,170 | 54.4 | 99.8 | 2,810 | 140.5 | Diglycollic Acid | 33.5 |
| 14b | 3a | 5,170 | 54.4 | 99.8 | 2,810 | 140.5 | Oxalic Acid | 31.5 |
| 15b | 3a | 5,170 | 54.4 | 99.8 | 2,810 | 140.5 | Aconitic Acid | 43.5 |
| 16b | 3a | 5,170 | 54.4 | 99.8 | 2,810 | 140.5 | Adipic Acid | 36.5 |
| 17b | 3a | 5,170 | 54.4 | 99.8 | 2,810 | 140.5 | Phthalic Anhyd | 37.0 |
| 18b | 3a | 5,170 | 54.4 | 99.8 | 2,810 | 140.5 | Maleic Anhyd | 24.5 |
| 19b | 4a | 6,320 | 34.6 | 81.7 | 3,430 | 150 | Maleic Anhyd | 21.4 |
| 20b | 4a | 6,320 | 34.6 | 81.7 | 3,430 | 150 | Phthalic Anhyd | 32.4 |
| 21b | 4a | 6,320 | 34.6 | 81.7 | 3,430 | 150 | Diglycollic Acid | 29.2 |
| 22b | 4a | 6,320 | 34.6 | 81.7 | 3,430 | 150 | Oxalic Acid | 27.6 |

TABLE 3

| Ex. No. of Acid Ester | Solvent | Amt. Solvent (grs.) | Esterification Temp., °C. | Time of Esterification (hrs.) | Water out (cc.) |
|---|---|---|---|---|---|
| 1b | Xylene and Diethyl ether of diethylene glycol. | 234 | 145 | 5½ | 11.0 |
| 2b | do | 225 | 145 | 2 | 35.0 |
| 3b | do | 258 | 142 | 5½ | 10.8 |
| 4b | do | 254 | 148 | 4 | |
| 5b | do | 223 | 143 | 4 | .9 |
| 6b | do | 231 | 148 | 4 | .6 |
| 7b | do | 228 | 145 | 7¾ | 8.5 |
| 8b | do | 247 | 147 | 7¼ | 8.4 |
| 9b | do | 209 | 142 | 2 | |
| 10b | do | 243 | 149 | 4 | |
| 11b | do | 226 | 143 | 4 | |
| 12b | do | 226 | 148 | 4 | |
| 13b | do | 169.5 | 180 | 4 | 4.5 |
| 14b | do | 158.5 | 150 | 1¾ | 13.5 |
| 15b | do | 179.5 | 160 | 3 | 4.5 |
| 16b | do | 172.5 | 195 | 9 | 4.5 |
| 17b | do | 177.0 | 165 | 4¾ | 0.5 |
| 18b | do | 164.5 | 155 | 4¾ | 0.5 |
| 19b | do | 171.4 | 158 | 5 | |
| 20b | do | 182.4 | 145 | 5 | |
| 21b | do | 175.2 | 170 | 4 | 4.0 |
| 22b | do | 165.6 | 160 | 2 | 12.0 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated hydroxy compounds of the kind specified and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases and the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present then indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally amber, dark amber, to reddish-brown and show moderate viscosity, or sometimes increased viscosity in light of what has been said previously in regard to cross-linking, gelation, etc. Unless there is some reason to do otherwise my preference is to handle these esters as 50% solutions in suitable solvents. They can be bleached with bleaching clays, filtering chars, and the like. However, for the purpose of demulsification or the like color is not a factor and decolorization is not justified.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 13b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 13b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to obtain by Letters Patent is:

1. A process for breaking petroleum emulsions of the water-in-oil type characterized by subjecting the emulsion to the action of a demulsifier, including acidic fractional esters; said acidic fractional esters being obtained by reaction between (A) a polycarboxy acid, and (B) high molal oxypropylation derivatives of glucose, with the proviso that (a) the oxypropylation end-product be within the molecular weight range of 1,500 to 15,000 on an average statistical basis; (b) the oxypropylation end-product be xylene-soluble; (c) the xylene-soluble characteristics of the oxypropylation end-product be substantially the result of the oxypropylation step; (d) the initial polyhydric reactant represent not more than 12% by weight of the oxypropylation end-product on a statistical basis, and that (e) the preceding provisos be based on complete reaction involving the propylene oxide and the initial polyhydric reactant, with the proviso that the ratio of (A) to (B) be one mole of the polycarboxy acid for each available hydroxyl radical.

2. A process for breaking petroleum emulsions of the water-in-oil type characterized by subjecting the emulsion to the action of a demulsifier, including acidic fractional esters; said acidic fractional esters being obtained by reaction between (A) a polycarboxy acid, and (B) high molal oxypropylation derivatives of glucose, with the proviso that (a) the oxypropylation end-product be within the molecular weight range of 1,500 to 15,000 on an average statistical basis; (b) the oxypropylation end-product be xylene-soluble and water-insoluble; (c) the xylene-soluble and water-insoluble characteristics of the oxypropylation end-product be substantially the result of the oxypropylation step; (d) the initial polyhydric reactant represent not more than 12% by weight of the oxypropylation end-product on a statistical basis, and that (e) the preceding provisos be based on complete reaction involving the propylene oxide and the initial polyhydric reactant, with the proviso that the ratio of (A) to (B) be one mole of the polycarboxy acid for each available hydroxyl radical.

3. A process for breaking petroleum emulsions of the water-in-oil type characterized by subjecting the emulsion to the action of a demulsifier, including acidic fractional esters; said acidic fractional esters being obtained by reaction between (A) a polycarboxy acid, and (B) high molal oxypropylation derivatives of glucose, with the proviso that (a) the oxypropylation end-product be within the molecular weight range of 1,500 to 15,000 on an average statistical basis; (b) the oxypropylation end-product be xylene-soluble, kerosene-soluble and water-insoluble; (c) the xylene-soluble, kerosene-soluble, and water-insoluble characteristics of the oxypropylation end-product be substantially the result of the oxypropylation step; (d) the initial polyhydric reactant represent not more than 12% by weight of the oxypropylation end-product on a statistical basis, and that (e) the preceding provisos be based on complete reaction involving the propylene oxide and the initial polyhydric reactant, with the proviso that the ratio of (A) to (B) be one mole of the polycarboxy acid for each available hydroxyl radical.

4. A process for breaking petroleum emulsions of the water-in-oil type characterized by subjecting the emulsion to the action of a demulsifier, including acidic fractional esters; said acidic fractional esters being obtained by reaction between (A) a dicarboxy acid, and (B) high molal oxypropylation derivatives of glucose, with the proviso that (a) the oxypropylation end-product be within the molecular weight range of 1,500 to 15,000 on an average statistical basis; (b) the oxypropylation end-product be xylene-soluble, kerosene-soluble and water-insoluble; (c) the xylene-soluble, kerosene-soluble, and water-insoluble characteristics of the oxypropylation end-product be substantially the result of the oxypropylation step; (d) the initial polyhydric reactant represent not more than 12% by weight of the oxypropylation end-product on a statistical basis, and that (e) the preceding provisos be based on complete reaction involving the propylene oxide and the initial polyhydric reactant, with the proviso that the ratio of (A) to (B) be one mole of the dicarboxy acid for each available hydroxyl radical.

5. A process for breaking petroleum emulsions of the water-in-oil type characterized by subjecting the emulsion to the action of a demulsifier, including acidic fractional esters; said acidic fractional esters being obtained by reaction between (A) a dicarboxy acid, and (B) high molal oxypropylation derivatives of glucose, with the proviso that (a) the oxypropylation end-product be within the molecular weight range of 1,500 to 15,000 on an average statistical basis; (b) the oxypropylation end-product be xylene-soluble, kerosene-soluble and water-insoluble; (c) the xylene-soluble, kerosene-soluble, and water-insoluble characteristics of the oxypropylation end-product be substantially the result of the oxypropylation step; (d) the initial polyhydric reactant represent not more than 12% by weight of the oxypropylation end-product on a statistical basis, and that (e) the preceding provisos be based on complete reaction involving the propylene oxide and the initial polyhydric reactant, with the proviso that the ratio of (A) to (B) be one mole of the dicarboxy acid for each available hydroxyl radical; and with the further proviso that the dicarboxy acid have not over 8 carbon atoms.

6. The process of claim 5 wherein the dicarboxy acid is phthalic acid.

7. The process of claim 5 wherein the dicarboxy acid is maleic acid.

8. The process of claim 5 wherein the dicarboxy acid is succinic acid.

9. The process of claim 5 wherein the dicarboxy acid is citraconic acid.

10. The process of claim 5 wherein the dicarboxy acid is diglycollic acid.

his
MELVIN × DE GROOTE.
mark

Witnesses to mark:
W. C. ADAMS,
I. S. DE GROOTE.

REFERENCES CITED

The following references are of record in the file of this patent:

UNITED STATES PATENTS

| Number | Name | Date |
| --- | --- | --- |
| 2,562,878 | Blair | Aug. 7, 1951 |
| 2,574,545 | De Groote | Nov. 13, 1951 |